(12) United States Patent
Kitanaka

(10) Patent No.: US 8,228,008 B2
(45) Date of Patent: Jul. 24, 2012

(54) MOTOR CONTROLLING APPARATUS

(75) Inventor: Hidetoshi Kitanaka, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 327 days.

(21) Appl. No.: 12/663,217

(22) PCT Filed: Jun. 7, 2007

(86) PCT No.: PCT/JP2007/061578
§ 371 (c)(1),
(2), (4) Date: Dec. 4, 2009

(87) PCT Pub. No.: WO2008/149447
PCT Pub. Date: Dec. 11, 2008

(65) Prior Publication Data
US 2010/0171448 A1 Jul. 8, 2010

(51) Int. Cl.
*H02P 5/74* (2006.01)
(52) U.S. Cl. .............. 318/45; 318/77; 318/112; 318/139
(58) Field of Classification Search ............... 318/45, 318/52, 53, 59, 66, 77, 78, 111, 112, 798–801, 318/139; 180/65.1, 65.21, 65.8
See application file for complete search history.

(56) References Cited

U.S. PATENT DOCUMENTS

| | | | |
|---|---|---|---|
| 5,278,477 A | | 1/1994 | Hartmann et al. |
| 5,373,223 A * | | 12/1994 | Akagi et al. ................ 318/722 |
| 6,278,256 B1 | | 8/2001 | Aoyama |
| 7,891,451 B2 * | | 2/2011 | Oyobe et al. ............. 180/65.275 |
| 2005/0052144 A1 | | 3/2005 | Matsubara et al. |
| 2008/0205106 A1 * | | 8/2008 | Nakamura et al. ............ 363/123 |
| 2009/0184681 A1 * | | 7/2009 | Kuno .......................... 320/128 |

FOREIGN PATENT DOCUMENTS

| | | |
|---|---|---|
| DE | 38 04 634 | 8/1989 |
| EP | 0832779 A2 | 4/1998 |
| EP | 1 455 438 | 9/2004 |
| EP | 1 515 425 A2 | 3/2005 |
| FR | 2 676 604 | 11/1992 |

(Continued)

OTHER PUBLICATIONS

* International Search Report for PCT/JP2007/061578 completed Sep. 5, 2007.

(Continued)

*Primary Examiner* — Bentsu Ro
(74) *Attorney, Agent, or Firm* — Buchanan Ingersoll & Rooney PC

(57) ABSTRACT

A motor controlling apparatus having a controller for controlling a plurality of inverters correspondingly provided to each of a plurality of alternating-current motors is reduced in size, mass, and cost by effectively grouping operations performed by each calculation unit included in the controller. This controller for controlling the inverters includes: a first common calculation unit and a second common calculation unit that calculate and output control signals that are common to each of the inverters; individual calculation units that individually calculate and output a control signal related to each of the inverters; and a common logic calculation unit 60 that outputs a gate signal for controlling switching of each of the inverters based on the signals received from the first common calculation unit, the second common calculation unit, and the individual calculation units.

12 Claims, 3 Drawing Sheets

FOREIGN PATENT DOCUMENTS

| | | |
|---|---:|---:|
| GB | 1 443 636 | 7/1976 |
| JP | 4-150701 A | 5/1992 |
| JP | 7-222456 A | 8/1995 |
| JP | 7-322417 A | 12/1995 |
| JP | 8-35713 A | 2/1996 |
| JP | 9-46812 A | 2/1997 |
| JP | 2001-238490 A | 8/2001 |
| JP | 2001-258291 A | 9/2001 |
| JP | 2004-166341 A | 6/2004 |
| JP | 2005-102377 A | 4/2005 |
| JP | 2005-257258 A | 9/2005 |
| JP | 2006-14489 A | 1/2006 |
| JP | 2006-115618 A | 4/2006 |
| JP | 2006-191736 A | 7/2006 |
| JP | 2006-211782 A | 8/2006 |
| JP | 2007-49867 A | 2/2007 |
| RU | 2 074 503 | 2/1997 |
| SU | 1791946 | 1/1993 |
| WO | WO 93/05567 | 3/1993 |

OTHER PUBLICATIONS

* Written Opinion for PCT/JP2007/061578 completed Sep. 5, 2007.
* Partial English translation of Office Action/Notice of Rejection for JP 2008-502764 issued Jul. 24, 2008.
* Partial English translation of Office Action/Decision of Rejection for JP 2008-502764 issued Nov. 27, 2008.

Extended Search Report from European Patent Office issued in corresponding European Patent Application No. 07828134.2 dated Apr. 27, 2011.

Office Action (Decision on Grant) dated Nov. 18, 2010, issued in the corresponding Russian Patent Application No. 2009149395, and an English Translation thereof.

Official Action issued by the European Patent Office on Jan. 16, 2012 in corresponding European Patent Application No. 07828134.2.

* cited by examiner

MOTOR CONTROLLING APPARATUS

TECHNICAL FIELD

The present invention relates to an alternating-current motor for driving an electric vehicle, and more particularly, to a motor controlling apparatus that is suitable for controlling a permanent magnet synchronous motor.

BACKGROUND ART

A conventional apparatus for controlling an electrically-driven vehicle generally has a structure that a plurality of induction motors, each attached to each of a plurality of axles on a truck, is driven together in parallel by a single inverter (for example, see Patent Document 1 below).

A technical problem in driving the induction motors together in parallel by a single inverter is in accommodating with different degrees of wear in diameters of a plurality of wheels (hereinafter, referred to as "wheel diameter") that are driven together by a single inverter.

It is well known that the rotation speed of an induction motor (=rotor frequency) is a value obtained by adding a slip frequency to an inverter frequency. The slip frequency has a significant meaning when induction motors are driven by a single inverter, because the slip frequency absorbs the difference between the inverter frequencies that are common among the induction motors and the rotor frequencies that are different among the induction motors.

More specific explanation will now be provided, using an example where a plurality of wheels are rotating on rails without slipping thereon.

The rotation speed of a motor becomes lower than those of others when a wheel diameter is greater (that is, a circumferential length thereof is longer) than the others. On the contrary, when the wheel diameter is smaller (that is, a circumferential length thereof is shorter), the rotation speed of the motor becomes higher. Because the inverter frequency is common among the motors, a difference in rotation speed is a difference in slip frequency applied to each of the induction motors. At this time, different degrees of torques are generated in the induction motors, correspondingly to the difference in the slip frequencies. However, because a rated slip frequency of an induction motor is generally set in such a manner that an expectable difference in the wheel diameter does not give any influence thereto, the generated torque difference is very limited and practically does not result in a problem.

Therefore, along with other advantages, it is suitable to use induction motors for driving motors together in parallel by a single inverter. In addition, by using the structure to drive induction motors by a single inverter, the number of inverters can be minimized, regardless of the number of induction motors installed on a vehicle. In this manner, the controlling apparatus can further be reduced both in weight and size.

Recently, a permanent magnet synchronous motor driven by an inverter is increasingly applied in fields such as industrial equipment or home appliances.

In comparison to an induction motor, a permanent magnet synchronous motor has advantages of not requiring an excitation current, because magnetic fluxes are established by permanent magnets, and of being highly efficient, because no current flows into the rotor, thus not causing a secondary copper loss. For these reasons, recently, various attempts have been made to apply a permanent magnet synchronous motor as a motor for driving an electric vehicle.

[Patent Document 1] Japanese Patent Application Laid-open No. 2006-014489

Disclosure of Invention

Problem to be Solved by the Invention

When applying a permanent magnet synchronous motor as a motor for driving an electric vehicle, minimizing of a structure of an apparatus including a plurality of permanent magnet synchronous motors is a critical matter.

Furthermore, as well known in the art, a permanent magnet synchronous motor operates with the inverter frequency synchronized with the rotor frequency. Therefore, permanent magnet synchronous motors, each differing in the rotation speed, cannot be driven together in parallel by a single inverter.

Therefore, if a permanent magnet synchronous motor is applied to an electric vehicle, a driving inverter will be required for each of the permanent magnet synchronous motors. Because, in an electric vehicle, each wheel is driven by a plurality of motors in a vehicle set, the number of required inverters increases. Therefore, a controller for the increased inverters becomes larger in size and cost. Thus, the controlling apparatus inevitably increases in size, mass, and cost.

The present invention is made in consideration of the above. An object of the present invention is to provide a motor controlling apparatus, having a controller for a plurality of inverters provided corresponding to each of a plurality of motors, where each of calculation units, to be arranged accordingly to each of the motors, is arranged effectively within a controller, and operations performed thereby are effectively grouped so as to reduce the size, the mass, and the cost thereof.

Means for Solving Problem

In order to solve the afore-mentioned problem and attain the object, a motor controlling apparatus for controlling a plurality of alternating-current motors is constructed in such a manner that it comprises: a direct-current voltage source; a plurality of inverters that are provided correspondingly to each of the alternating-current motors, and outputs an alternating-current voltage at a predetermined frequency obtained by converting a direct-current voltage supplied from the direct-current voltage source to each of the alternating-current motors; a contactor that opens and closes an output end of each of the inverters; a voltage detector that detects the direct-current voltage supplied to each of the inverters; a current detector that detects a current in each of the alternating-current motors; and a controller that outputs at least a control signal to the inverters based on a control command supplied externally, the voltage detected by the voltage detector, the current detected by the current detector, and a signal indicating conditions of rotations of the alternating-current motors, wherein the controller includes: a first common calculation unit having: a sequence processor that generates and outputs a first control signal that relates to generation of a torque command, based on a drive command signal input externally, and a protection detector that detects an abnormality in the alternating-current motors and the motor controlling apparatus, and generates a second control signal indicating the abnormality to cause the inverters to stop; a second common calculation unit having a basic torque command generator that generates and outputs a basic torque command that is common to the inverters based on the first control signal received from the first common calculation unit; an individual calculation unit that individually generates and outputs third control signals individually related to each of the inverters based on the basic torque command received from the second common calculation unit; and a common logic calculation unit that calculates and outputs a first gate signal for controlling switching of each of the inverters based on the second control signals received from the common calculation unit and the third control signals received from a plurality of such individual calculation unit, and is commonly provided to the individual calculation units so as to enable the first gate signals corresponding to each of the inverters to be controlled simultaneously.

Effect of the Invention

In a motor controlling apparatus according to the present invention, calculation units in the controller are grouped into: the common calculation unit that calculates and outputs control signals that are common among inverters; the individual calculation unit that individually calculates and outputs control signals related to each of the inverters; and the common logic calculation unit that outputs gate signals for controlling switching of each of the inverters based on signals received from the common calculation units and the individual calculation units. Thus, operations performed by each of the calculation units are effectively grouped, and each of the calculation units, arranged in accordance with each of the motors, is effectively arranged within a controller. Therefore, the present invention achieves the effects to reduce the size, the mass, and the cost of the motor controlling apparatus.

Figure 1:
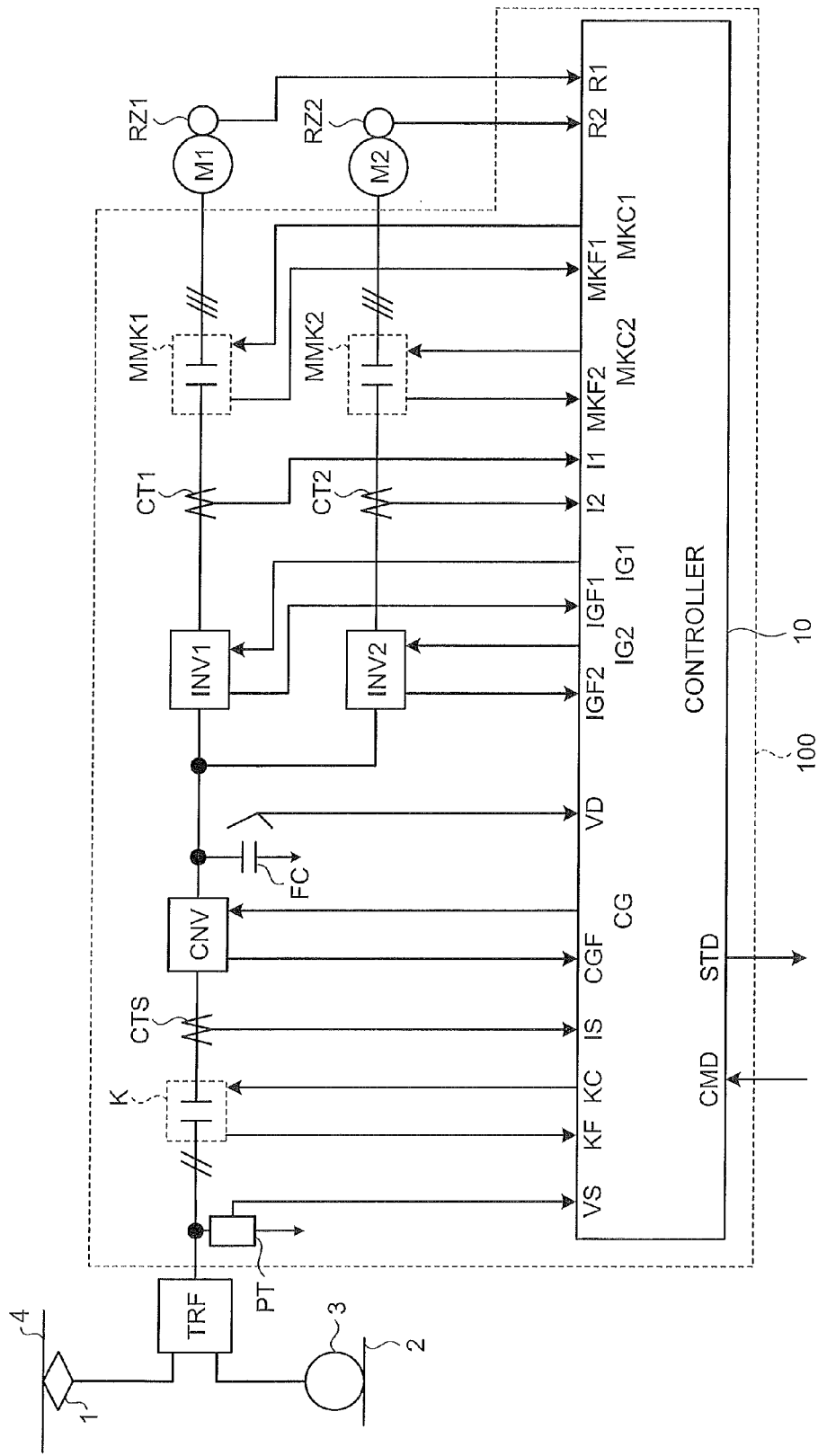
FIG. 1 is a schematic of a motor controlling apparatus according to an exemplary embodiment of the present invention.

EXPLANATIONS OF LETTERS OR NUMERALS 1 power collector
2 rail
3 wheel
4 electric wire
10 controller
20 first common calculation unit
21 sequence processor
22 protection detector
23 communication processor
24 second common calculation unit
25 basic torque command generator
30 average calculator
40A, 40B individual calculation unit
41A, 41B torque command processor
42A, 42B slip controller
43A, 43B INV controller
50 converter controller
51 CNV controller
60 common logic calculation unit
61A, 61B, 62 gate logic
63 speed calculator
64 contactor logic
65 high-speed protection detector
66 OR circuit
100 controlling apparatus
CNV converter
CT1 first motor current sensor
CT2 second motor current sensor
CTS input current sensor
FC filter capacitor
INV1 first inverter
INV2 second inverter
K input-side contactor
M1 first permanent magnet synchronous motor
M2 second permanent magnet synchronous motor
MMK1, MMK2 motor-side contactor
PT input voltage detector
RZ1 first rotation sensor
RZ2 second rotation sensor
SQ sequence status
TRF transformer

BEST MODE(S) FOR CARRYING OUT THE INVENTION

A motor controlling apparatus according to an exemplary embodiment of the present invention will now be explained based on the drawings. Note that the embodiment is not intended to limit the scope of the present invention in any way.

FIG. 1 is a schematic of a motor controlling apparatus according to an exemplary embodiment of the present invention. In this schematic, a controlling apparatus 100 according to the embodiment includes, sequentially from an input-stage side thereof, an input voltage detector PT, an input-side contactor K, an input current sensor CTS, a converter CNV, a filter capacitor FC, a first and a second inverters INV1 and INV2, a first and a second motor current sensors CT1 and CT2, and a first and a second motor-side contactors MMK1 and MMK2.

Furthermore, as shown in FIG. 1, the primary-side end of a transformer TRF is connected to an electric wire 4 via a power collector 1, and the other end is connected to a rail 2 that is at a ground potential via a wheel 3. In other words, electric power supplied from an electric power substation (not shown) is received via the electric wire 4, the power collector 1, the wheel 3, and the rail 2.

An arrangement, connections, functions, and operations of each of these units in the controlling apparatus 100 will now be explained.

(Input Voltage Detector PT)

In FIG. 1, the secondary-side of the transformer TRF is connected to the controlling apparatus 100, and the voltage output from the TRF is input to the input-side contactor K that functions to isolate the controlling apparatus 100 from the transformer TRF. An input voltage VS that is the voltage at the secondary-side of the transformer TRF is input to a controller 10 via the input voltage detector PT. Because the voltage at the secondary side of the transformer TRF is usually high (approximately 1500 volts), a low-voltage winding may be provided in the transformer TRF, and the input voltage VS may be obtained therefrom.

(Input-Side Contactor K)

The input-side contactor K is a contactor having a capability to open and close a current of several-hundred amperes, and is set to OFF when the controlling apparatus 100 is to be stopped or some abnormality occurs, and set to ON during usual operations. The controller 10 outputs a control signal KC to the input-side contactor K to turn ON or OFF an internal closing coil provided therein, so as to control the opening and the closing of a main contact. A status of the main contact in the input-side contactor K is returned to the controller 10 as a contact status signal KF through, for example, an auxiliary contact and alike mechanically cooperating therewith.

(Input Current Sensor CTS)

At the next stage to the input-side contactor K, the input current sensor CTS is provided to detect an input current IS. The input current IS detected by the input current sensor CTS is input to the controller 10.

(Converter CNV)

At the next stage to the input current sensor CTS, the converter CNV is provided to convert the input alternating-current voltage to a direct-current (DC) voltage VD and to output the DC voltage VD to the filter capacitor FC. The converter CNV includes a bridge circuit having switching devices such as insulated gate bipolar transistors (IGBTs), and generally is structured to be a so-called voltage-type pulse width modulation (PWM) converter that causes each of the switching devices to perform PWM operation. The converter CNV receives a gate signal CG from the controller 10 for each of the switching devices, and reversely outputs an operation status signal CGF of each of the switching devices to the controller 10. Because the structure of and the operation performed by the voltage-type PWM converter are well known in the art, a detailed explanation thereof is omitted herein.

(Filter Capacitor FC)

The filter capacitor FC is connected to the output side of the converter CNV. The first inverter INV1 and the second inverter INV2 are connected to positive and negative terminals of the filter capacitor FC in parallel, and are each supplied with DC voltage VD that is the voltage output from the converter CNV.

(First and Second Inverters Inv1 and Inv2)

The first inverter INV1 includes a bridge circuit having switching devices such as IGBTs, and generally is structured to be a so-called voltage-type pulse width modulation (PWM) inverter that causes each of the switching devices to perform PWM operation. The first inverter INV1 receives a gate signal IG1 from the controller 10 for each of the switching devices, and reversely outputs an operation status signal IGF1 of each of the switching devices to the controller 10. Because the structure of and the operation performed by the voltage-type PWM inverter are well known in the art, a detailed explanation thereof is omitted herein. Moreover, because the structure of and the operation performed by the second inverter INV2 are the same as those of the first inverter INV1, explanations of the structure and the operation performed thereby are omitted herein.

(First and Second Motor Current Sensors CT1 and CT2)

At the output side of the first inverter INV1, the first motor current sensor CT1 is provided to detect the output current of the first inverter INV1 (that is, a motor current). A first motor current I1 detected by the motor current sensor CT1 is input to the controller 10. Moreover, at the output end of the second inverter INV2, the second motor current sensor CT2 is provided, and the output current detected by the second motor current sensor CT2 is input to the controller 10.

(First and Second Motor-Side Contactors MMK1 and MMK2)

At the next stage to the motor current sensor CT1, the first motor-side contactor MMK1 is provided. The first motor-side contactor MMK1 is a contactor having a capability to open and close a current of several-hundred amperes, and is set to OFF when the controlling apparatus 100 is to be stopped or some abnormality occurs, and set to ON during usual operations. The controller 10 outputs a control signal MKC1 to the first motor-side contactor MMK1 to turn ON or OFF an internal closing coil provided therein so as to control opening and closing of the main contact. The status of the main contact in the first motor-side contactor MMK1 is returned to the controller 10 as a contact status signal MKF1 through, for example, an auxiliary contact and alike mechanically cooperating therewith. Furthermore, at the next stage to the motor current sensor CT2, the second motor-side contactor MMK2 is provided. Because a function and an operation performed thereby are the same as those of the first motor-side contactor MMK1, explanations of the function and the operation performed thereby are omitted herein.

(First Permanent Magnet Synchronous Motor M1)

At the next stage to the first motor-side contactor MMK1, the first permanent magnet synchronous motor M1 is connected. The first permanent magnet synchronous motor M1 is mechanically connected to the wheel 3, and is structured to drive the wheel 3. In addition, a first rotation sensor RZ1 is connected to the first permanent magnet synchronous motor M1, and a detected value R1 is input to the controller 10.

(Second Permanent Magnet Synchronous Motor M2)

At the next stage to the second motor-side contactor MMK2, the second permanent magnet synchronous motor M2, mechanically connected to another wheel 3 that is not the wheel 3 connected to the first permanent magnet synchronous motor M1, is connected. Moreover, to the second permanent magnet synchronous motor M2, a second rotation sensor RZ2 is connected, and a detected value R2 is input to the controller 10.

(First and Second Rotation Sensors RZ1 and RZ2)

Both of the first rotation sensor RZ1 and the second rotation sensor RZ2 are so-called encoders or resolvers, and the detected values R1 and R2 detected by the rotation sensors are signals indicating an absolute position of a rotor in each of the motors. A so-called sensorless controlling scheme is also commercialized, which obviates a rotation sensor that obtains the absolute position of the rotor of a motor by performing a calculation based on the voltage and current of the motor. If the sensorless controlling scheme is to be used, the first rotation sensor RZ1 and the second rotation sensor RZ2 are not required.

(Controller 10)

The controller 10 includes a microcomputer (MC) or a logical circuit, and a control source that supplies a power thereto. The controller 10 outputs a control signal (KC, CG, IG1, IG2, MKC1, and MKC2) to each of these units following predetermined procedures to control each of the units based on a drive command signal CMD input from a cab (not shown) and alike of the electric vehicle and a status signal received from each of the units described above (at least the input voltage VS, the contact status signal KF at the input-side contactor K, the input current IS, the operation status signal CGF at the switching devices of the converter, the DC voltage VD, the operation status signal IGF1 at the switching devices in the first inverter, the operation status signal IGF2 at the switching device in the second inverter, the first motor current I1, the second motor current I2, the contact status signal MKF1 at the first motor-side contactor MMK1, the contact status signal MKF2 at the second motor-side contactor MMK2, the detected value R1 at the first rotation sensor RZ1, and the detected value R2 at the second rotation sensor RZ2). If the received status signal indicates an abnormal value, the controller 10 performs a control operation such as stopping each of these units by way of the control signal to be provided thereto.

In addition to these control signals, the controller 10 outputs a status notifying signal STD, and receives the drive command signal CMD. The status notifying signal STD is a signal for indicating an operation status or an abnormal status of each of the units in the controlling apparatus 100, and is output in a form of, for example, a data communication or a contact signal to an external cab or an equipment status monitoring apparatus (neither of which is shown) and alike. The drive command signal CMD at least includes signals corresponding to a move-forward/backward command, a power running command and strength thereof, a brake command and strength thereof.

In FIG. 1, an example of an AC-fed electric vehicle is shown as an exemplary embodiment of the motor controlling apparatus. The motor controlling apparatus may also be applied to a DC-fed electric vehicle that is widely used in subways and suburban railways. If the motor controlling apparatus is to be applied to a DC-input electric vehicle, the transformer TRF and the converter CNV are not required, and the DC voltage (generally approximately DC600 volts to 3000 volts) supplied from the electric wire 4 is directly applied to the filter capacitor FC as the DC voltage VD.

(Detailed Structure of Controller 10)

Figure 2:
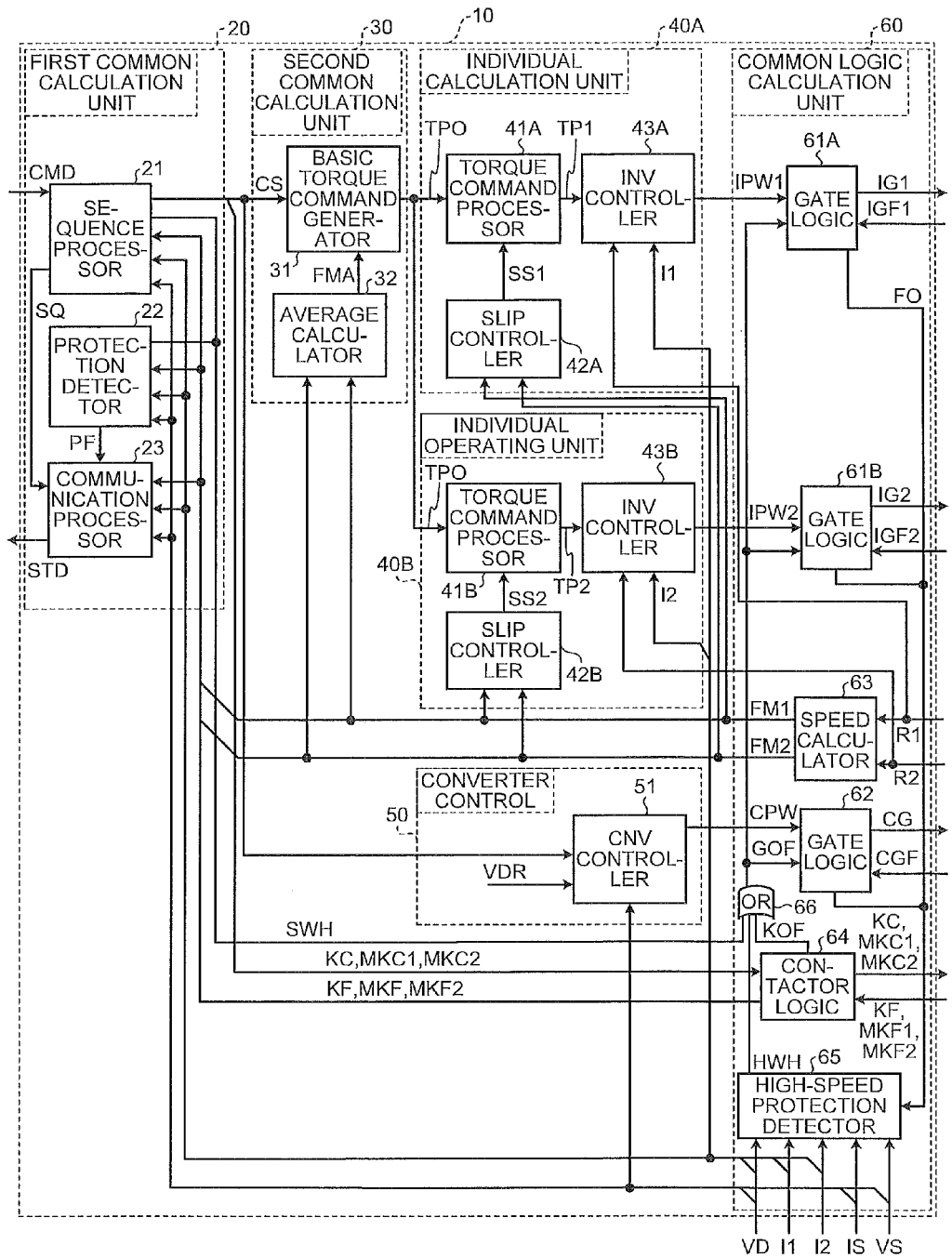
FIG. 2 is a schematic of a structure of a controller according to the exemplary embodiment.

Detailed structure of the controller 10 will now be explained. FIG. 2 is a schematic of a structure of the controller 10 according to the exemplary embodiment. As shown in FIG. 2, the controller 10 includes a first common calculation unit 20, a second common calculation unit 30, individual calculation units 40A and 40B, a converter controller 50, and a common logic calculation unit 60.

(Structure of First Common Calculation Unit 20)

The first common calculation unit 20 includes a sequence processor 21, a protection detector 22, and a communication processor 23.

(First Common Calculation unit 20—Sequence Processor 21)

The sequence processor 21 receives the drive command signal CMD provided externally and the status signals (VS, KF, IS, CGF, VD, IGF1, IGF2, I1, 12, MKF1, MKF2, FM1, and FM2) from each of the units in the controlling apparatus 100. Based on the drive command signal CMD, the sequence processor 21 outputs, with a prescribed sequence logic, a control signal CS including a code of a torque command corresponding to a drive forward/backward command, a power running command, a brake command, a torque cut instruction and alike to a basic torque command generator 31 to be described later. At the same time, the sequence processor 21 outputs KC that is a close command for the input-side contactor K, MKC1 that is a close command for the first motor-side contactor MMK1, and MKC2 that is a close command for the second motor-side contactor MMK2 to the common logic calculation unit 60 to be described later.

(First Common Calculation unit 20—Protection Detector 22)

The protection detector 22 generates a control signal SWH based on the status signals, and outputs the control signal SWH to the common logic calculation unit 60. In addition, when a voltage, a current, and alike of each of the units in the controlling apparatus exceed a predetermined value, the protection detector 22 determines the situation as abnormal and outputs a signal upon determination of the abnormality as abnormality detected status signal PF to the communication processor 23.

(First Common Calculation unit 20—Communication Processor 23)

The communication processor 23 receives the status signals (VS, KF, IS, CGF, VD, IGF1, IGF2, I1, 12, MKF1, MKF2, FM1, and FM2) from each of the units in the controlling apparatus, the abnormality detected status signal PF from the protection detector 22, and a sequence status SQ from the sequence processor 21. The communication processor 23 outputs the status notifying signal STD to the cab of the electric vehicle, the equipment status monitoring apparatus (neither of which is shown), and alike, in a form of, for example, a data communication or a contact signal.

(Structure of Second Common Calculation Unit 30)

The second common calculation unit 30 includes the basic torque command generator 31 and an average calculator 32.

(Second Common Calculation unit 30—Basic Torque Command Generator 31)

The control signal CS from the sequence processor 21 is input to the basic torque command generator 31. The basic torque command generator 31 generates a basic torque command TP0 using the power running command, the brake command, and the commands of respective strengths thereof. The basic torque command TP0 is a value determined at least based on the power running command, the brake command, the commands of respective strength thereof, and the speed of the electric vehicle.

(Second Common Calculation unit 30—Average Calculator 32)

The speed of the electric vehicle, used for generating the basic torque command TP0, is generated at the average calculator 32. The average calculator 32 performs an averaging operation to a speed FM1 of the first permanent magnet synchronous motor generated from the detected value R1 obtained at the first rotation sensor RZ1, and a speed FM2 of the second permanent magnet synchronous motor generated from the detected value R2 obtained at the second rotation sensor RZ2, and outputs the output of the averaging operation to the basic torque command generator 31 as an average motor speed FMA.

Figure 3:
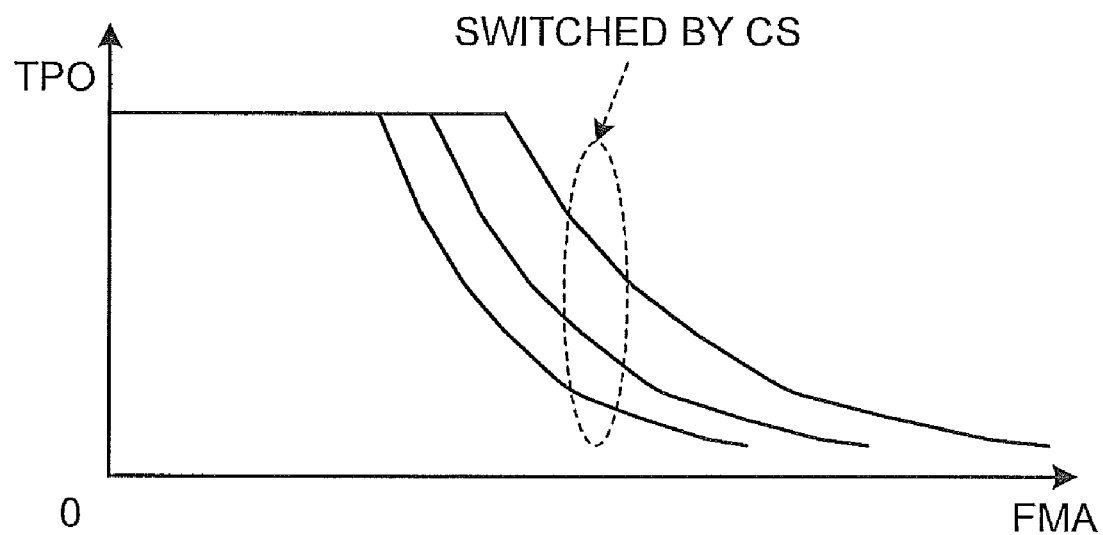
FIG. 3 is a schematic of an example of a basic torque command TP0.

FIG. 3 is a schematic of an example of the basic torque command TP0. The horizontal axis thereof represents the average motor speed FMA generated by the average calculator 32, and the vertical axis thereof represents the basic torque command TP0 generated by the basic torque command generator 31. As shown in FIG. 3, the basic torque command TP0 has several profiles that are dependent on the average motor speed, and these profiles are switched by the control signal CS output from the sequence processor 21.

(Structures of Individual Calculation units 40A and 40B)

The basic torque command TP0 is input to the individual calculation units 40A and 40B. The individual calculation unit 40A corresponds to controls of the first permanent magnet synchronous motor M1, and the individual calculation unit 40B corresponds to controls of the second permanent magnet synchronous motor M2. Although not especially shown in the schematic, the number of motors controlled by the controller 10 is not limited to two. When control a third and a fourth permanent magnet synchronous motors is required, individual calculation units, each corresponding thereto, may be added. A structure of each of the individual calculation units is as shown in FIG. 2. Although the reference letters and numerals are different, the structure, the arrangement, the function, and alike are all the same. Therefore, in the explanation below, the individual calculation unit 40A, provided corresponding to controls of the first permanent magnet synchronous motor M1, is representatively explained.

(Structure of Individual Calculation Unit 40a)

The individual calculation unit 40A includes a torque command processor 41A, a slip controller 42A, and an INV controller 43A.

(Individual Calculation unit 40A—Torque Command Processor 41A)

The torque command processor 41A receives the basic torque command TP0 and a control signal SS1 from the slip controller 42A, calculates a torque command TP1, and outputs the torque command TP1 to the INV controller 43A. The torque command processor 41A has a function to narrow down the basic torque command based on the control signal SS1 from the slip controller 42A, and to output an adjusted optimal value as the torque command TP1. The torque command processor 41A also has a function, when the basic torque command TP0 input thereto is excessive, to limit and adjust the basic torque command TP0 to an optimal torque command TP1.

The functions provided to the torque command processor 41A will now be explained in further detail. As mentioned above, while the basic torque command TP0 generated at the second common calculation unit 30 is calculated with reference to the average motor speed FMA, the operation cycle of the second common calculation unit 30 is longer with respect to that of the individual calculation unit 40A, as will be described later. Therefore, especially when the speed of the electric vehicle is changing and thus the basic torque command TP0 is changing, the basic torque command TP0 may exceed the maximum torque that each of the motors is capable of outputting. Because such a situation may result in instability of controls, the torque command processor 41A has a function to limit the torque command TP1 at or below the maximum torque the motor is capable of outputting.

(Individual Calculation unit 40A—Slip Controller 42A)

The slip controller 42A receives the speed FM1 of the first permanent magnet synchronous motor and the speed FM2 of the second permanent magnet synchronous motor. When the difference between the speed FM1 of the first permanent magnet synchronous motor and the speed FM2 of the second permanent magnet synchronous motor is equal to or higher than a predetermined value, or when any one of the speed FM1 of the first permanent magnet synchronous motor and the speed FM2 of the second permanent magnet synchronous motor or both is equal to or higher than a predetermined acceleration, the slip controller 42A determines such a situation as wheel slippage, calculates how much the torque command should be narrowed down to reduce the torque command TP1, appends the amount to the control command SS1, and outputs the control command SS1 to the torque command processor 41A. For detailed structures and functions of the slip controller 42A, because various known examples are available, explanations thereof are omitted herein.

(Individual Calculation unit 40A—INV Controller 43A)

The INV controller 43A receives at least the torque command TP1, the detected value R1 at the first rotation sensor RZ1, and the first motor current I1. The INV controller 43A calculates a motor current command from the input torque command TP1, further calculates an inverter voltage command IPW1 so as to bring the motor current command to match the first motor current I1, and outputs the inverter voltage command IPW1. Because a known and widely used vector control technique can be applied to the INV controller 43A, an explanation thereof is omitted herein.

(Structure of Converter Controller 50)

The converter controller 50 includes a CNV controller 51.

(Converter Controller 50—CNV Controller 51)

The CNV controller 51 receives at least the control signal CS from the sequence processor 21, the input voltage VS, a command value VDR of the DC voltage VD, the DC voltage VD, and the input current IS. The CNV controller 51 generates an input current command based on a result of a proportional-integral (PI) control performed to match the detected DC voltage VD to the command value VDR, and phase information of the input voltage VS; calculates a converter voltage command CPW so as to match the input current IS to the input current command; and outputs the converter voltage command CPW to a gate logic 62 to be described later. For the converter controller 50, a controlling method of the voltage-type PWM converter that is a known technology can be applied, thus a detailed explanation thereof is omitted herein.

(Structure of Common Logic Calculation Unit 60)

The common logic calculation unit 60 includes gate logics 61A and 61B, the gate logic 62, a speed calculator 63, a contactor logic 64, a high-speed protection detector 65, and an OR circuit 66.

(Common Logic Calculation unit 60—Gate Logic 61A)

The gate logic 61A receives the inverter voltage command IPW1 output from the INV controller 43A, the operation status signal IGF1 output from the first inverter INV1, and a gate OFF signal GOF that is to be described later. The gate logic 61A calculates a PWM gate signal IG1 corresponding to the received inverter voltage command IPW1, and outputs the PWM gate signal IG1 to the first inverter INV1. Generally, the PWM gate signal IG1 is generated based on a result of comparison between a carrier signal (not shown) and the inverter voltage command IPW1. Because a known method can be applied thereto, the detailed explanation thereof is omitted herein. In addition, the gate logic 61A outputs an abnormality detection signal FO when the received operation status signal IGF1 indicates an abnormality in a switching device (not shown) in the first inverter INV1. Examples of possible abnormal conditions of a switching device (not shown) include an excessive current, an over temperature, and a driving voltage degradation in a switching device.

(Common Logic Calculation unit 60-Gate Logic 61B)

The gate logic 61B receives the inverter voltage command IPW2 from an INV controller 43B, the operation status signal IGF2 from the second inverter INV2, and the gate OFF signal GOF that is to be described later. Because functions of the gate logic 61B will become clear by reading the explanation of the gate logic 61A while replacing "IGF1" with "IGF2", "INV1" with "INV2", "IG1" with "IG2", and "a switching device in the first inverter INV1" with "a switching device in the second inverter INV2", detailed explanations thereof are omitted herein.

(Common Logic Calculation unit 60—Gate Logic 62)

The gate logic 62 receives the converter voltage command CPW from the CNV controller 51, the operation status signal CGF from the converter CNV, and the gate OFF signal GOF that is to be described later. Because functions of the gate logic 62 will become clear by reading the explanation of the gate logic 61A while replacing "IGF1" with "CGF", "first inverter INV1" with "converter CNV", "IG1" with "CG", and "a switching device in the first inverter INV1" with "a switching device in the converter CNV", detailed explanations thereof are omitted herein.

(Common Logic Calculation unit 60—Speed calculator 63)

The speed calculator 63 receives the signal R1 indicating the absolute position of the rotor of the motor M1 from the first rotation sensor RZ1, as well as the signal R2 indicating the absolute position of the rotor of the motor M2 from the second rotation sensor RZ2. The speed calculator 63 calculates the speed FM1 of the first permanent magnet synchronous motor from the signal R1 obtained from the first rotation sensor RZ1, and the speed FM2 of the second permanent magnet synchronous motor from the signal R2 obtained from the first rotation sensor RZ2.

(Common Logic Calculation unit 60—Contactor Logic 64)

The contactor logic 64 receives the control signal KC for controlling the input-side contactor K, the control signal MKC1 for controlling the first motor-side contactor MMK1, and the control signal MKC2 for controlling the second motor-side contactor MMK2 from the sequence processor 21. The contactor logic 64 also receives the contact status signals KF, MKF1, and MKF2 indicating the contact statuses of the input-side contactor K, the first motor-side contactor MMK1, the second motor-side contactor MMK2, respectively, therefrom. The contactor logic 64 converts the close command signal KC for controlling the input-side contactor K, the close command signal MKC1 for controlling the first motor-side contactor MMK1, and the close command signal MKC2 for controlling the second motor-side contactor MMK2, each of which is received from the sequence processor 21, into closing coil driving voltages (e.g., DC 100 volts) for the input-side contactor K, the first motor-side contactor MMK1, and the second motor-side contactor MMK2, respectively, and outputs the closing coil driving voltages thereto. The contactor logic 64 also outputs a control signal KOF when the close command signals KC, MKC1, and MKC2 received from the sequence processor 21 are set to OFF, or when the contact status signals KF, MKF1, and MKF2 received from each of these contactors are set to OFF.

(Common Logic Calculation unit 60—High-Speed Protection Detector 65)

The high-speed protection detector 65 receives the input voltage VS, the input current IS, the DC voltage VD, the first motor current I1, the second motor current I2, and the abnormality detection signal FO. The high-speed protection detector 65 outputs a protection detection signal HWH when each of the input signals does not satisfy a condition of a predetermined value. A hardware-based structure such as ones using a Field Programmable Gate Array (FPGA) widely used today is more preferably used than software-based operations for comparing the input voltage VS, the input current IS, the DC voltage VD, the first motor current I1, and the second motor current I2 against the conditions of the predetermined values, and for outputting the protection detection signal HWH. By employing this kind of hardware structure, the protection operation can be performed much faster than when the software is used (at the operation cycle of approximately several microseconds).

(Common Logic Calculation unit 60—OR Circuit 66)

The OR circuit 66 receives the protection detection signal HWH from the high-speed protection detector 65, the control signal KOF from the contactor logic 64, and the control signal SWH from the sequence processor 21. An output from the OR circuit 66 is input to the gate logics 61A, 61B, and 62 in a bulk as a gate OFF signal GOF. Upon receiving the gate OFF signal GOF, the gate logic 61A, 61B, and 62 set the gate signals IG1, IG2, and CG to OFF.

With the common logic calculation unit 60 having the structure described above, when an abnormal status is indicated by the protection detection signal HWH, the control signal KOF from the contactor logic 64, or the control signal SWH from the sequence processor 21, all of the gate signals can be set to OFF simultaneously. To complement the explanation further, because the converter CNV and each of the inverters INV1 and INV2 are commonly connected to the filter capacitor FC to share the DC voltage VD as shown in FIG. 1, the capability to set each of the gate signals quickly and simultaneously becomes extremely important to prevent an impact of an abnormality that has occurred locally (e.g., excessive voltage) from affecting healthy parts.

(Operation Cycle of Each Calculation Units)

An operation cycle for each of the calculation units for performing the above described processes is preferably set as follows: several milliseconds for the first common calculation unit 20 and the second common calculation unit 30; several-tens to several-hundreds of microseconds for the operation cycles of the individual calculation units 40A and 40B, and the converter controller 50; and several microseconds or less for the operation cycles of the common logic calculation unit 60. Reasons for this are as described below.

Each of the first common calculation unit 20 and the second common calculation unit 30 mainly includes: a function to generate the control command including the torque command corresponding to the drive forward/backward command, the power running command, and the brake command, based on the drive command signal CMD; a function to detect abnormality in a cooling apparatus or an increase in temperature; a protective functions that does not require quick operations in the order of microseconds, such as detecting abnormality of the contactors and alike; and a communication function to allow the operation conditions to be monitored externally. The processing speed to implement these functions may be relatively slow.

On the contrary, each of the operations performed by the individual calculation units 40A and 40B, and the converter controller 50 is required to control the motor current or the input current. Therefore, a higher operation speed is required so as to cope with current changes in the main circuit.

Furthermore, the common logic calculation unit 60 functions to output the gate signals to the switching devices in the inverters INV1 and INV2, and the converter, and is required to operate quickly to provide a protection against an excessive current or an excessive voltage. Therefore, an operation processing time needs to be one digit faster than those of the individual calculation units 40A and 40B.

From the perspective of performance, it is ideal if the operation cycles can be set to several microseconds for all of the processes; however, with the technology today, the faster the operation speed is, the greater the power consumption will be in the MC that performs the operation, thus requiring a control source with a larger capacity to supply a power to the MC. Furthermore, the faster the operation speed is, the more heat the MC will generate. Therefore, larger cooling fins or cooling fans will be required in the controller 10, leading to increase in the size, the mass, and the cost of the controller 10.

If an optimal operation speed is selected based on operations, the power consumption and the heating by the MC can be suppressed while maintaining the controlling performance for the motors. In this manner, the capacity of the control source and the sizes of the cooling fins or the cooling fans can be reduced. In addition, if the controller 10 can be reduced in size, weight, and cost, it becomes feasible to reduce the size, the mass, and the cost of the controlling apparatus 100.

As described above, the controller 10 includes: the first common calculation unit 20 that generates the control signal CS for commonly controlling a plurality of the inverters INV1 and INV2; the second common calculation unit 30 that calculates and outputs the basic torque command TP0 for commonly controlling the inverters INV1 and INV2; the individual calculation units 40A and 40B that individually calculates and outputs the inverter voltage command IPW1 and IPW2 for the inverters INV1 and INV2, respectively; and the common logic calculation unit 60 that outputs the gate signals IG1 and IG2 to the inverters INV1 and INV2, respectively, based on the control signals output from the common calculation units 20 and 30, and the individual calculation units 40A and 40B. Therefore, following effects can be achieved.

(Effects of Motor Controlling Apparatus According to Embodiment)

To begin with, as described above, because a permanent magnet synchronous motor operates with the inverter frequency synchronized with the rotor frequency, a plurality of permanent magnet synchronous motors cannot be driven together in parallel by a single inverter. Therefore, a driving inverter is required for each of the permanent magnet synchronous motors, thus further requiring an individual controller for each of the inverters. According to the embodiment, the controller 10 is used commonly for each of the inverters. The sequence processor 21, the protection detector 22, the communication processor 23, the basic torque command generator 31, and the average calculator 32 are shared among the inverters. Therefore, software operating in the controller 10 can be minimized, enabling the size, the weight, and the cost of the controller 10 to be reduced. In this manner, the size, the mass, and the cost of the controlling apparatus 100 can be reduced.

Furthermore, the gate logics 61A, 61B, and 62, corresponding to each of the inverters and the converter, are included in the common logic calculation unit 60 that is commonly used. Therefore, even if an abnormality occurs in one of the inverters, the gate signals corresponding to each of the inverters that are commonly connected to the filter capacitor FC can be quickly set to OFF simultaneously. In this manner, damages caused by a failure can be prevented from spreading to the entire controlling apparatus 100.

Furthermore, the first common calculation unit 20 includes: the sequence processor 21 that calculates and outputs the control signal CS at least for the inverters INV1 and INV2 in response to the drive command signal CMD provided externally; the protection detector 22 that detects an abnormality in the controlling apparatus 100, and stops at least all of the inverters; and the communication processor 23 that receives the input voltage VS, the input current IS, the DC voltage VD, the motor currents I1 and I2, and the each of the signals output from the protection detector 22 and the sequence processor 21, and outputs the signals to the external equipment status monitoring apparatus. Therefore, information related to each of the inverters can be centrally managed, and some parts of the operation processes for each of the inverters can be made common. Thus, the size of software operating in the controller 10 can be minimized, enabling the size, the weight, and the cost of the controller 10 to be reduced. In this manner, the size, the mass, and the cost of the controlling apparatus 100 can be reduced.

Furthermore, the first common calculation unit 20 includes the sequence processor 21, the protection detector 22, and the communication processor 23. In addition, the second common calculation unit 30 includes the basic torque command generator 31 that receives the control signal CS and the speed signals FM1 and FM2 from the sequence processor 21, and outputs the basic torque command TP0 to the individual calculation units 40A and 40B. Therefore, although the control signal is commonly used for each of the inverters, only the operation speed of the basic torque command generator 31 can be increased that is required to be faster than those of the operations performed internally in the first common calculation unit 20. Thus, the operation speed of the entire common calculation unit is not required to be increased. As a result, the power consumption of the MC, as well as the size of the control source for the MC, can be reduced, thus enabling the size, the weight, and the cost of the controller 10 to be reduced. In this manner, the size, the mass, and the cost of the controlling apparatus 100 can also be reduced.

Furthermore, the basic torque command TP0 is calculated by using the average motor speed FMA of a plurality of the alternating-current motors. In addition, the basic torque command TP0 that is the result of the calculation is commonly input to the individual calculation units 40 each of which corresponds to each of the motors. Therefore, even if some of the wheels slip, or if the number of the motor rotations becomes different among the motors because of the wheel diameters, it is possible to stably obtain the basic torque command TP0 that is averagely required for a vehicle to obtain a predetermined acceleration.

Furthermore, because the basic torque command generator 31 is a common calculation unit, the software size in the entire controller 10 can be reduced in comparison with a structure including the basic torque command generator 31 in the individual calculation unit. Therefore, the controller 10 can be structured with a minimum MC. In this manner, the controller 10 can be reduced in the size, the weight, and the cost, further enabling the controlling apparatus 100 to be reduced in size, the mass, and the cost.

Furthermore, the individual calculation units 40A and 40B each include: the slip controllers 42A and 42B that calculate the control signals SS1 and SS2 based on the speed FM1 and FM2 of each of the motors; the torque command processors 41A and 41B that calculate the torque commands TP1 and TP2 based on the outputs from the slip controllers 42A and 42B and the basic torque command TP0 from the common calculation unit 30; and the INV controllers 43A and 43B that output the inverter voltage commands IPW1 and IPW2 to the inverters INV1 and INV2 to match the torque of each of the motors M1 and M2 to the torque commands TP1 and TP2, based on the torque commands TP1 and TP2, the motor currents I1 and I2, the signal R1 from the first rotation sensor RZ1, and the signal R2 from the second rotation sensor RZ2. Therefore, it is possible to allocate only the torque control portions (corresponding to the INV controllers 43A and 43B) and the slip control portions (the slip controller 42A, 42B), requiring individual control due to different rotation of the wheels, of the permanent magnet synchronous motor to the individual calculation units. Thus, the software size in the entire controller 10 can be reduced to be minimized, and the controller 10 can be formed by a minimum MC. In this manner, the controller 10 can be reduced in the size, the weight, and the cost, further enabling the controlling apparatus 100 to be reduced in size, the mass, and the cost.

Furthermore, the common logic calculation unit 60 includes: the gate logics 61A and 61B that output gate signals IG1 and IG2, respectively, corresponding to each of the inverters, based on the inverter voltage commands IPW1 and IPW2, corresponding to the inverters INV1 and INV2, received from the INV controllers 43A and 43B; the high-speed protection detector 65 that outputs the protection detection signal HWH when each of the signals obtained from the input voltage VS, the input current IS, the first motor current I1, the second motor current I2, and the DC voltage VD does not satisfy a predetermined condition (for example, the DC voltage VD has exceeded a predetermine value); and the contactor logic 64 that outputs the control signals to the input-side contactor K and the motor-side contactors MMK1 and MMK2, and outputs the control signal KOF according to the contact status signals. In this manner, the common logic calculation unit 60 can simultaneously set the gate signals IG1 and IG2, each of which corresponds to each of the inverters INV1 and INV2 to OFF, based on the protection detection signal HWH, the control signal KOF, and the control signal SWH received from the common calculation unit 20. Thus, when an abnormality occurs in one of the inverters or in each of the contactors, the gate signals, corresponding to each of the inverters commonly connected to the filter capacitor FC and sharing the DC voltage VD, can be set to OFF quickly and simultaneously. In this manner, damages due to a failure can be prevented from spreading to the entire controlling apparatus 100.

Furthermore, when the controlling apparatus 100 further includes the converter CNV for converting the alternating-current voltage to the direct-current voltage as a direct-current voltage source, the controller 10 further includes: the first common calculation unit 20; the converter controller 50 having the CNV controller 51 that receives the control signal CS from the first common calculation unit 20, and the signals from the DC voltage VD, the input voltage VS, and the input current IS; and the gate logic 62 that outputs the gate signal CG for the converter CNV based on the control signal CPW received from the converter controller 50. In addition, the common logic calculation unit 60 including the gate logic 62 can simultaneously set the gate signals, corresponding to each of the inverters, and the gate signal for the converter to OFF, based on the protection detection signal HWH, the control signal KOF, and the control signal SWH from the first common calculation unit 20. Therefore, even if an abnormality occurs in one of the inverters, in the converter, or in each of the contactors, the gate signals, corresponding to each of the inverters and the converter commonly connected to the filter capacitor FC and sharing the DC voltage VD, can be set to OFF quickly and simultaneously. In this manner, damages due to a failure can be prevented from spreading to the entire controlling apparatus 100.

Furthermore, in the controller 10, the operation cycles are set shorter in the order of the first common calculation unit 20, the second common calculation unit 30, the individual calculation units 40A and 40B, and the common logic calculation unit 60. Therefore, the optimal operation speed can be achieved based on the operations performed thereby. In this manner, the power consumption and the heating of the MC can be suppressed while maintaining the control performance for the motors. As a result, the capacity of the control source and the size of the cooling fan for the controller 10 can be reduced, thus enabling the size, the weight, and the cost of the controller 10 to be reduced. In this manner, the size, the mass, and the cost of the controlling apparatus 100 can be reduced.

(Remarks for Other Embodiments and Applications)

The present invention is described using an example of the controlling apparatus including two inverters, the inverters INV1 and INV2; however, the number of the inverters is not limited thereto, and the scope of the present invention can be easily extended to a case where three or more inverters are used. If three or more inverters are to be used, the present invention can be easily applied by providing additional individual calculation units corresponding to each of the inverters, and also adding corresponding gate logics to the common logic calculation unit 60.

The structures described in each of the embodiments are only examples of the present invention. It should be needless to mention that the present invention may also be combined with other known technologies, and modification, such as omitting a part thereof, can be made in any way without deviating from the sprit of the present invention.

Furthermore, the present invention is described to be applied to a controlling apparatus for an electric vehicle; however, the field of application is not limited to the electric vehicle, but also may be applied in various other related fields such as electric automobile, elevators, and alike.

Industrial Applicability

As described above, the motor controlling apparatus according to the present invention is useful as an invention that reduces the size and the cost of a controller for controlling inverters that has increased in number, and suppresses an increase in the size, mass, and cost of a motor controlling apparatus having a plurality of inverters corresponding to each of a plurality of motors.

The invention claimed is:

1. A motor controlling apparatus for controlling a plurality of alternating-current motors, the motor controlling apparatus comprising:
   a direct-current voltage source;
   a plurality of inverters that are provided correspondingly to each of the alternating-current motors, and outputs an alternating-current voltage at a predetermined frequency obtained by converting a direct-current voltage supplied from the direct-current voltage source to each of the alternating-current motors;
   a contactor that opens and closes an output end of each of the inverters;
   a voltage detector that detects the direct-current voltage supplied to each of the inverters;
   a current detector that detects a current in each of the alternating-current motors; and
   a controller that outputs at least a control signal to the inverters based on a control command supplied externally, the voltage detected by the voltage detector, the current detected by the current detector, and a signal indicating conditions of rotations of the alternating-current motors, wherein
   the controller includes:
   a first common calculation unit having:
      a sequence processor that generates and outputs a first control signal that relates to generation of a torque command, based on a drive command signal input externally, and
      a protection detector that detects an abnormality in the alternating-current motors and the motor controlling apparatus, and generates a second control signal indicating the abnormality to cause the inverters to stop;
   a second common calculation unit having a basic torque command generator that generates and outputs a basic torque command that is common to the inverters based on the first control signal received from the first common calculation unit;
   an individual calculation unit that individually generates and outputs third control signals individually related to each of the inverters based on the basic torque command received from the second common calculation unit; and
   a common logic calculation unit that calculates and outputs a first gate signal for controlling switching of each of the inverters based on the second control signal received from the first common calculation unit and the third control signals received from a plurality of such individual calculation units, and is commonly provided to the individual calculation units so as to enable the first gate signals corresponding to each of the inverters to be controlled simultaneously.

2. The motor controlling apparatus according to claim 1, wherein the common logic calculation unit comprises a high-speed protection detector that generates and outputs a protection detection signal that is one of control signals for setting the first gate signals output to each of the inverters to OFF simultaneously.

3. The motor controlling apparatus according to claim 1, wherein the basic torque command generator generates and outputs a common basic torque command to the individual calculation units corresponding to each of the inverters based on rotation speeds of the alternating-current motors.

4. The motor controlling apparatus according to claim 1, wherein the basic torque command is generated based on an average speed among each of the alternating-current motors.

5. The motor controlling apparatus according to claim 1, wherein the individual calculation unit further comprises:
- a slip controller that calculates how much a torque command, which is to be applied to each of the alternating-current motors, is to be narrowed down based on the rotation speeds of the alternating-current motors;
- a torque command processor that calculates a required torque command for each of the alternating-current motors based on an output of the slip controller and the basic torque command from the common calculation unit; and
- an INV controller that outputs a control signal to each of the inverters based on the torque command, the signal received from the current detector, and the rotation conditions of the alternating-current motors, so as to match a torque of each of the alternating-current motors to the torque command.

6. The motor controlling apparatus according to claim 5, wherein the common logic calculation unit comprises:
- a gate logic that generates and outputs the first gate signals corresponding to each of the inverters, based on the third control signals corresponding to each of the inverters, received from the INV controller; and
- a high-speed protection detector that outputs a protection detection signal when the current detected by and obtained from the current detector, the voltage detected by and obtained from the voltage detector do not satisfy a predetermined condition, wherein the first gate signals to be output to each of the inverters are set to OFF simultaneously when at least the second control signal or the protection detection signal indicates an abnormality.

7. The motor controlling apparatus according to claim 6, wherein the common logic calculation unit further comprises a contactor logic that outputs a contactor status signal corresponding to ON or OFF status of the contactor, wherein the first gate signals to be output to each of the inverters are set to OFF simultaneously depending on the contactor status signal.

8. The motor controlling apparatus according to claim 1, wherein when a converter for converting a predetermined alternating-current voltage to a direct-current voltage is provided as the direct-current voltage source, the controller further comprises a converter controller that generates and outputs a converter voltage command based on the first control signal from the first common calculation unit and the voltage detected by and received from the voltage detector, and the common logic calculation unit further comprises a gate logic that generates and outputs the second gate signal to the converter based on the converter voltage command.

9. The motor controlling apparatus according to claim 8, wherein the common logic calculation unit is structured so that the first gate signals to be output to each of the inverters and the second gate signal to be output to the converter are set to OFF simultaneously when at least the second control signal or the protection detection signal indicates an abnormality.

10. The motor controlling apparatus according to claim 9, wherein the common logic calculation unit further comprises a contactor logic that outputs a contactor status signal corresponding to ON or OFF status of the contactor, and the common logic calculation unit is structured to set the first gate signals corresponding to each of the inverters and the second gate signal to be output to the converter to OFF simultaneously depending on the contactor status signal.

11. The motor controlling apparatus according to claim 1, wherein operation cycles of the first common calculation unit, the second common calculation unit, the individual calculation units, and the common logic calculation unit are set to different values.

12. The motor controlling apparatus according to claim 1, wherein, in the controller, operation cycles are set to become shorter in an order: the first common calculation unit, the second common calculation unit, the individual calculation units, and the common logic calculation unit.

* * * * *